US009845427B2

(12) United States Patent
Soane et al.

(10) Patent No.: US 9,845,427 B2
(45) Date of Patent: Dec. 19, 2017

(54) PROPPANTS FOR HYDRAULIC FRACTURING TECHNOLOGIES

(75) Inventors: David Soane, Chestnut Hill, MA (US); Robert P. Mahoney, Newbury, MA (US); Rosa Casado Portilla, Peabody, MA (US)

(73) Assignee: SELF-SUSPENDING PROPPANT LLC, Chesterland, OH (US)

( * ) Notice: Subject to any disclaimer, the term of this patent is extended or adjusted under 35 U.S.C. 154(b) by 529 days.

(21) Appl. No.: 12/908,411

(22) Filed: Oct. 20, 2010

(65) Prior Publication Data
US 2011/0120719 A1 May 26, 2011

Related U.S. Application Data

(60) Provisional application No. 61/253,350, filed on Oct. 20, 2009.

(51) Int. Cl.
*C09K 8/80* (2006.01)
*C09K 8/94* (2006.01)

(52) U.S. Cl.
CPC ............... *C09K 8/805* (2013.01); *C09K 8/94* (2013.01)

(58) Field of Classification Search
CPC ............ E21B 2034/007; E21B 17/042; E21B 33/124; E21B 47/12; E21B 17/18; E21B 34/10; E21B 34/14; E21B 43/14; E21B 7/04; E21B 34/16; E21B 33/06; E21B 33/138; E21B 34/06; E21B 34/063; E21B 34/12; E21B 37/00; E21B 43/127; E21B 43/128; E21B 43/16; E21B 43/162; E21B 43/20; E21B 43/2406; E21B 43/305; E21B 47/00; E21B 47/0001; E21B 33/12; E21B 43/26; E21B 3/00; E21B 2034/005; E21B 28/00; E21B 29/002; E21B 33/1208; E21B 33/1285; E21B 7/24; E21B 7/28; E21B 44/00; E21B 7/00; E21B 10/42; E21B 19/24; E21B 41/0007; E21B 43/105; E21B 43/112; E21B 43/12; E21B 43/123; C09K 2208/10; C09K 2208/30; C09K 8/02; C09K 8/36; C09K 8/46; C09K 8/52; C09K 8/58; C09K 8/584; C09K 8/62; C09K 8/80; C09K 8/84

See application file for complete search history.

(56) References Cited

U.S. PATENT DOCUMENTS

| | | | |
|---|---|---|---|
| 2,703,316 A | 3/1955 | Schneider | |
| 3,912,692 A | 10/1975 | Casey et al. | |
| 4,022,736 A | 5/1977 | Schmitt et al. | |
| 4,387,769 A | 6/1983 | Erbstoesser et al. | |
| 4,532,052 A | 7/1985 | Weaver et al. | |
| 5,124,376 A | 6/1992 | Clark, Jr. | |
| 5,161,615 A | 11/1992 | Hutchins et al. | |
| 5,216,050 A | 6/1993 | Sinclair | |
| 5,728,742 A | 3/1998 | Staples et al. | |
| 5,837,656 A | 11/1998 | Sinclair et al. | |
| 5,924,488 A | 7/1999 | Nguyen et al. | |
| 5,925,714 A | 7/1999 | Larson et al. | |
| 6,109,350 A | 8/2000 | Nguyen et al. | |
| 6,169,058 B1 | 1/2001 | Le et al. | |
| 6,279,656 B1 * | 8/2001 | Sinclair | C09K 8/516 166/304 |
| 6,323,307 B1 | 11/2001 | Bigg et al. | |
| 6,605,674 B1 | 8/2003 | Whipple et al. | |
| 6,667,374 B2 | 12/2003 | Hernandez-Barajas et al. | |
| 6,734,147 B2 | 5/2004 | Levy | |
| 6,742,590 B1 | 6/2004 | Nguyen | |
| 6,866,099 B2 | 3/2005 | Nguyen | |
| 6,892,813 B2 | 5/2005 | Nguyen et al. | |
| 7,021,379 B2 | 4/2006 | Nguyen | |
| 7,032,667 B2 | 4/2006 | Nguyen et al. | |
| 7,044,220 B2 | 5/2006 | Nguyen et al. | |
| 7,131,491 B2 | 11/2006 | Blauch et al. | |
| 7,132,389 B2 | 11/2006 | Lee | |
| 7,135,231 B1 | 11/2006 | Sinclair et al. | |
| 7,178,596 B2 | 2/2007 | Blauch et al. | |
| 7,204,312 B2 | 4/2007 | Roddy et al. | |
| 7,216,711 B2 | 5/2007 | Todd et al. | |
| 7,228,904 B2 | 6/2007 | Todd et al. | |
| 7,244,492 B2 | 7/2007 | Sinclair et al. | |
| 7,261,156 B2 | 8/2007 | Nguyen et al. | |
| 7,264,051 B2 | 9/2007 | Nguyen et al. | |
| 7,299,869 B2 | 11/2007 | Kalman | |
| 7,308,939 B2 | 12/2007 | Welton et al. | |
| 7,442,741 B2 * | 10/2008 | Boyer | C08J 3/03 524/510 |
| 7,461,697 B2 | 12/2008 | Todd et al. | |
| 7,482,309 B2 | 1/2009 | Ravi et al. | |

(Continued)

FOREIGN PATENT DOCUMENTS

| | | |
|---|---|---|
| CA | 276357 | 12/1927 |
| CA | 276357 | 1/2008 |

(Continued)

OTHER PUBLICATIONS http://www.aqua-calc.com/page/density-table/substance/bauxite-coma-and-blank-crushed downloaded on Aug. 14, 2015.*
http://www.aqua-calc.com/page/density-table/substance/sand-coma-and-blank-fine downloaded on Aug. 14, 2015.*
http://www.aqua-ca~c.c~m/page/density-tab~e/substance/bauxite-c~ma-and-b~ank-crushed downloaded on Aug. 14, 2015.*
http://www.balcoindia.com/operation/bauxite2.aspx downloaded on Aug. 14, 2015.*
U.S. Appl. No. 13/599,828, Mahonet et al. (co-pending application).
U.S. Appl. No. 13/838,806, Mahoney et al. (co-pending application).
Kim, A. J., et al., "Swelling-Based Method for Preparing Stable, Functionalized Polymer Colloids" J. Am. Chem. Soc., 127(6): 1592-1593 (2005).
Kim, A.J. et al., "Swelling-Based Method for Preparing Stable, Functionalized Polymer Colloids," J. Am. Chem. Soc., 127(6); 1592-1593 (2005).

(Continued)

*Primary Examiner* — Kumar R Bhushan
(74) *Attorney, Agent, or Firm* — Calfee, Halter & Griswold LLP

(57) ABSTRACT

The invention is directed to systems and methods for forming and using proppant particles having desirable attributes.

7 Claims, No Drawings

(56) References Cited

U.S. PATENT DOCUMENTS

| | | |
|---|---|---|
| 7,490,667 B2 | 2/2009 | Sinclair et al. |
| 7,571,767 B2 | 8/2009 | Parker et al. |
| 7,666,469 B2 | 2/2010 | Weintritt et al. |
| 7,718,583 B2 | 5/2010 | Barmatov et al. |
| 7,721,804 B2 | 5/2010 | Duenckel |
| 7,726,070 B2 | 6/2010 | Thrash |
| 7,730,948 B2 | 6/2010 | de Grood et al. |
| 7,754,659 B2 | 7/2010 | Rediger et al. |
| 7,772,163 B1 | 8/2010 | Brannon et al. |
| 7,789,147 B2 | 9/2010 | Brannon et al. |
| 7,902,128 B2 | 3/2011 | Zhang et al. |
| 7,931,084 B2 | 4/2011 | Nguyen et al. |
| 7,931,087 B2 | 4/2011 | Gupta |
| 7,931,089 B2 | 4/2011 | Miller et al. |
| 7,934,554 B2 | 5/2011 | Roddy |
| 7,968,501 B2 | 6/2011 | Parris |
| 7,972,997 B2 | 7/2011 | Svoboda et al. |
| 8,058,213 B2 | 11/2011 | Rediger et al. |
| 8,062,998 B2 | 11/2011 | Fulton et al. |
| 8,066,068 B2 | 11/2011 | Lesko et al. |
| 8,105,986 B2 | 1/2012 | Zhang |
| 8,127,849 B2 | 3/2012 | Gupta |
| 8,236,738 B2 | 8/2012 | Zhang |
| 8,240,383 B2 | 8/2012 | Xu et al. |
| 9,297,244 B2 | 3/2016 | Mahoney et al. |
| 9,315,721 B2 | 4/2016 | Mahoney et al. |
| 2003/0106713 A1 | 6/2003 | Slater et al. |
| 2003/0131998 A1* | 7/2003 | Nguyen ............... C09K 8/68 166/280.2 |
| 2004/0081015 A1 | 4/2004 | Graham |
| 2004/0188089 A1* | 9/2004 | Nguyen ............... C09K 8/805 166/280.1 |
| 2004/0244978 A1 | 12/2004 | Shaarpour |
| 2005/0006095 A1 | 1/2005 | Justus et al. |
| 2005/0019574 A1 | 1/2005 | McCrary |
| 2005/0115710 A1 | 6/2005 | Kotlar et al. |
| 2005/0123590 A1* | 6/2005 | Burton ............... A61L 15/225 424/445 |
| 2005/0167105 A1 | 8/2005 | Roddy et al. |
| 2005/0194141 A1 | 9/2005 | Sinclair et al. |
| 2005/0244641 A1 | 11/2005 | Vincent |
| 2005/0274510 A1 | 12/2005 | Nguyen et al. |
| 2006/0175059 A1* | 8/2006 | Sinclair ............... C09K 8/805 166/283 |
| 2006/0185847 A1 | 8/2006 | Saini |
| 2006/0211776 A1 | 9/2006 | Crews |
| 2007/0202318 A1* | 8/2007 | Smith ............... B01J 13/02 428/323 |
| 2007/0227732 A1 | 10/2007 | Miller et al. |
| 2007/0246214 A1 | 10/2007 | Fish et al. |
| 2008/0011477 A1* | 1/2008 | Rediger ............... C09K 8/64 166/280.2 |
| 2008/0108524 A1 | 5/2008 | Willberg et al. |
| 2008/0176009 A1 | 7/2008 | Chereau et al. |
| 2008/0257553 A1 | 10/2008 | Gatlin et al. |
| 2008/0257833 A1 | 10/2008 | Fite et al. |
| 2008/0289828 A1 | 11/2008 | Hutchins et al. |
| 2009/0038797 A1* | 2/2009 | Skala ............... C09K 8/80 166/280.1 |
| 2009/0038799 A1 | 2/2009 | Garcia-Lopez De Victoria et al. |
| 2009/0062154 A1 | 3/2009 | Windebank et al. |
| 2009/0071653 A1 | 3/2009 | Hodge |
| 2009/0099047 A1 | 4/2009 | Cunningham et al. |
| 2010/0089581 A1 | 4/2010 | Nguyen et al. |
| 2010/0126726 A1 | 5/2010 | Armstrong |
| 2010/0147515 A1 | 6/2010 | Hughes et al. |
| 2010/0167965 A1 | 7/2010 | Sebastian et al. |
| 2010/0204071 A1 | 8/2010 | Zhang |
| 2010/0249273 A1 | 9/2010 | Scales et al. |
| 2010/0252262 A1 | 10/2010 | Ekstrand et al. |
| 2010/0256024 A1 | 10/2010 | Zhang |
| 2010/0270023 A1 | 10/2010 | Dusterhoft |
| 2010/0307749 A1* | 12/2010 | Nguyen ............... C09K 8/805 166/278 |
| 2011/0098377 A1 | 4/2011 | Huang et al. |
| 2011/0120719 A1 | 5/2011 | Soane et al. |
| 2011/0289841 A1 | 12/2011 | Thrash |
| 2011/0298941 A1 | 12/2011 | Thrash |
| 2012/0018162 A1 | 1/2012 | Tanguay et al. |
| 2012/0058355 A1 | 3/2012 | Lee et al. |
| 2012/0071371 A1 | 3/2012 | Zhang |
| 2012/0080192 A1 | 4/2012 | Hendrickson et al. |
| 2012/0225800 A1 | 9/2012 | Hendrickson |
| 2012/0267105 A1 | 10/2012 | Zhang |
| 2012/0267112 A1 | 10/2012 | Zhang et al. |
| 2013/0233545 A1 | 9/2013 | Mahoney et al. |
| 2014/0000891 A1 | 1/2014 | Mahoney et al. |
| 2014/0060832 A1 | 3/2014 | Mahoney et al. |
| 2014/0076558 A1 | 3/2014 | Nguyen et al. |
| 2014/0087974 A1 | 3/2014 | Villarreal |
| 2014/0138092 A1 | 5/2014 | Reddy et al. |
| 2014/0228258 A1 | 8/2014 | Mahoney et al. |
| 2015/0252252 A1 | 9/2015 | Soane et al. |

FOREIGN PATENT DOCUMENTS

| | | |
|---|---|---|
| CA | 2763357 A1 | 12/2010 |
| CN | 1894284 A | 1/2007 |
| CN | 101903453 A | 12/2010 |
| CN | 102127415 | 7/2011 |
| CN | 102167969 A | 8/2011 |
| CN | 104379697 A | 2/2015 |
| EP | 0101855 A | 3/1984 |
| EP | 0933414 | 4/2003 |
| EP | 2066761 | 2/2009 |
| EP | 2027361 | 6/2009 |
| EP | 2175004 A | 4/2010 |
| EP | 2433998 | 3/2012 |
| EP | 1654439 B | 6/2012 |
| JP | 05237369 | 9/1993 |
| JP | 10054990 | 2/1998 |
| JP | 200014604 | 5/2000 |
| JP | 2001058126 | 3/2001 |
| JP | 2001342377 | 12/2001 |
| JP | 2004517712 | 6/2004 |
| JP | 2006508074 | 3/2006 |
| JP | 3832777 | 10/2006 |
| JP | 2007532721 | 11/2007 |
| JP | 2009503196 | 1/2009 |
| JP | 2009542862 | 12/2009 |
| JP | 2010502992 | 1/2010 |
| JP | 2010513212 | 4/2010 |
| RU | 2392295 | 6/2010 |
| RU | 2445339 | 3/2012 |
| RU | 2446200 | 3/2012 |
| RU | 2459852 | 8/2012 |
| WO | 199530818 | 11/1995 |
| WO | 1995005604 | 11/1995 |
| WO | 2005121505 A2 | 12/2005 |
| WO | 2006023172 | 3/2006 |
| WO | 2007007039 | 1/2007 |
| WO | 2007147072 | 12/2007 |
| WO | 2008028074 | 3/2008 |
| WO | 2008042317 | 4/2008 |
| WO | 2008056302 | 5/2008 |
| WO | 2008130279 | 10/2008 |
| WO | 2009078745 | 6/2009 |
| WO | 2009088315 | 7/2009 |
| WO | 2009091511 | 7/2009 |
| WO | 2010043852 | 4/2010 |
| WO | 20100070600 | 6/2010 |
| WO | 2010084442 | 7/2010 |
| WO | 2010126925 | 11/2010 |
| WO | 2010129119 | 11/2010 |
| WO | 2011050046 | 4/2011 |
| WO | 2011056409 | 5/2011 |
| WO | 2011063004 | 5/2011 |
| WO | 2011081549 | 7/2011 |
| WO | 20011136678 | 11/2011 |
| WO | 2012010627 | 1/2012 |

(56) References Cited

FOREIGN PATENT DOCUMENTS

| WO | 2012045155 | 4/2012 |
|---|---|---|
| WO | 2013158306 | 10/2013 |
| WO | 2013188413 | 12/2013 |

OTHER PUBLICATIONS

Norman, I.R., "Application of Curable Resin-Coated Proppants", SPE Production Engineering, Nov. 1992.
International Search Report and Written Opinion from International Application No. PCT/US2010/053354 dated Dec. 21, 2010.
Written Opinion from International Application No. PCT/US2012/053134 dated Nov. 26, 2012.
International Preliminary Report on Patentability from International Application No. PCT/2012/05134 dated Mar. 4, 2014.
International Search Report and Written Opinion from International Application No. PCT/US2013/032424 dated Jun. 6, 2013.
International Search Report and Written Opinion from International Application No. PCT/2013/046867 dated Feb. 20, 2014.
International Search Report and Written Opinion from International Application No. PCT/US2013/032435 dated Jun. 6, 2013.
International Search Report and Written Opinion from International Application No. PCT/US2013/050098 dated Mar. 11, 2014.
International Preliminary Report on Patentability from International Application No. PCT/US2013050098 dated Dec. 23, 2014.
International Preliminary Report on Patentability from International Application No. PCT/US2013/046867 dated Dec. 23, 2014.
International Preliminary Report on Patentabiltiy from International Application No. PCT/US2013/050098 dated Dec. 23, 2014.
International Preliminary Report on Patentability from International Application No. PCT/2013/032424 dated Oct. 21, 2014.
International Preliminary Report on Patentabiltiy from International Application No. PCT/US2013/032435 dated Oct. 21, 2014.
Office Action from U.S. Appl. No. 13/838,806, dated Apr. 9, 2015.
Office Action from Canadian Patent Application No. 2,777,748 dated May 14, 2014.
Patent Examination Report No. 1 from Australian Patent Application No. 2013249741 dated Dec. 14, 2015.
First Office Action from Chinese Patent Application No. 201280042615.x dated Nov. 23, 2015.
Search Report from European Patent Application No. 13778014.4 dated Nov. 19, 2015.
Patent Examination Report No. 1 from Australian Patent Application No. 2013249743 dated Dec. 18, 2015.
Patent Examination Report No. 1 from Australian Patent Application No. 2012301900 dated Oct. 15, 2015.
Office Action from U.S. Appl. No. 13/923,158 dated Jun. 4, 2015.
Office Action from U.S. Appl. No. 13/599,828 dated May 6, 2015.
Search Report from European Patent Application No. 12828438.7 dated Aug. 18, 2015.
International Search Report and Written Opinion from PCT/US2015/18374 dated May 28, 2015.
website printout, Wikipedia's monographs on Binding Constant; http://en.wikipedia/org/wiki/Binding_constant: page last modified on Feb. 1, 2014; retrieved Apr. 23, 2015; 2 pages.
website printout, Wikipeidia's monographs on Ligand; http://en.wikipedia/prg/wiki/Ligand_(biochemistry); page last modified on Feb. 6, 2014; retrieved Apr. 23, 2015; 5 pages.
Clarke, Neil, "Binding equilibria", Topics in Biophysical Chemistry, 1998; http://biophysics.med.jhmi/edu/courses/pdf/bindeq.pdf; 18 pages.
Thordason, Determining Association Constants from Titration Experiments in Supramolecular Chemistry, Chem. Soc. Rev. 2011, vol. 40, pp. 1305-1323.
Marina Ma, Evans WJ, Berger RL; "Use of the twin-cell differential titration calorimeter for binding studies I. EDTA and its calcium complex," J. Biochem Biophys Methods, Mar. 10, 1985 (506); 273-85.
Office Action from Canadian Patent Application No. 2845840 dated Jul. 24, 2015.
International Search Report and Written Opinion from International Application No. PCT/US2015/018377 dated Jun. 5, 2015.
Response to Office Action dated Apr. 9, 2015 from U.S. Appl. No. 13/838,806 dated Sep. 2, 2015.
Notice of Allowance from U.S. Appl. No. 13/838,806 dated Dec. 24, 2015.
Response to Office Action dated May 6, 2015 from U.S. Appl. No. 13/599,828, filed Nov. 5, 2015.
Response to Office Action dated May 14, 2014 from Canadian Patent Application No. 2,777,748 dated Nov. 16, 2015.
Notice of Allowance from U.S. Appl. No. 13/599,828 dated Feb. 29, 2016.
Search Report from European Patent Application No. 13778228.0 dated Nov. 6, 2015.
Response to Office Action dated Jul. 24, 2015 from Canadian Patent Application No. 2,845,840 dated Jan. 22, 2016.
First Office Action from Russian Patent Application No. 2014107250 dated Apr. 25, 2016.
International Search Report and Written Opinion from International Application No. PCT/US2016/026166 dated Jun. 13, 2016.
Office Action from U.S. Appl. No. 14/197,596 dated Jun. 7, 2016.
First Office Action from Chinese Patent Application No. 201380030233.X dated Aug. 19, 2016.
First Office Action from Chinese Patent Application No. 201380030270.0 dated Aug. 30, 2016.
Response to Office Action dated Oct. 15, 2015 in Australian Patent Application No. 2012301900 dated Sep. 5, 2016.
Response to Office Action dated Jun. 6, 2016 from U.S. Appl. No. 14/197,596 dated Sep. 15, 2016.
Response to Office Action dated Apr. 1, 2016 from Canadian Patent Application No. 2,845,840 dated Oct. 31, 2016.
Response to first Office Action from Russian Patent Application No. 2014107250 dated Jul. 5, 2016, with an english translation of the amended set of claims.
Decision to Grant from Russian Patent Application No. 2014107250 dated Aug. 25, 2016.
Response to first Office Action for Chinese Patent Application No. 201280042615.x dated Oct. 28, 2016, with an english translation of the observations and amended claims.
First Office Action from U.S. Appl. No. 15/339,986 dated Dec. 29, 2016.
Office Action from U.S. Appl. No. 14/197,596 dated Dec. 12, 2016.
Response to Office Action dated Oct. 14, 2016 from European Patent Application No. 13778228.0 dated Dec. 15, 2016.
Office Action from U.S. Appl. No. 15/078,371 dated Jan. 13, 2017.
Notice of Allowance from U.S. Appl. No. 14/958,112 dated Jan. 17, 2017.
Office Action for U.S. Appl. No. 15/081,037 dated Jan. 23, 2017.
First Office Action for Omani Patent Application No. OM/P/2014/00039 received Office Action for Omani dated Feb. 25, 2017.
Second Office Action for Chinese Patent Application No. 201280042615.X dated Feb. 21, 2017.
Office Action for U.S. Appl. No. 15/340,000 dated Feb. 17, 2017.
Response to Office Action dated Dec. 12, 2016 for U.S. Appl. No. 14/197,596 dated Mar. 14, 2017.
Office Action for Taiwanese Patent Application No. 102141303 dated Jun. 21, 2017. (English text summary attached).
Amendment and Response to Office Action dated Apr. 6, 2017 for U.S. Appl. No. 14/197,596 dated Jun. 26, 2017.
Notice of Allowance for Canadian Patent Application No. 2,777,748 dated Aug. 10, 2017.
Office Action for U.S. Appl. No. 15/078,371 dated Aug. 2, 2017.
Notice of Allowance for U.S. Appl. No. 15/081,037 dated Jun. 29, 2017.
Response to Office Action dated Feb. 17, 2017 for Canadian Patent Application No. 2,845,840 dated Aug. 17, 2017.
Response to Office Action dated May 25, 2017 for U.S. Appl. No. o 15/339,986 dated Aug. 24, 2017.
Office Action for U.S. Appl. No. 14/197,596 dated Apr. 6, 2017.
Response to Office Action dated Jan. 13, 2017 for U.S. Appl. No. 15/078,371 dated Apr. 12, 2017.
Response to Office Action dated Jan. 23, 2017 for U.S. Appl. No. 15/081,037 dated Apr. 21, 2017.

(56) References Cited

OTHER PUBLICATIONS

Office Action for U.S. Appl. No. 15/339,986 dated May 25, 2017.
Response to Second Office Action from Chinese Patent Application No. 201280042615.x dated May 8, 2017.
Response to Office Action dated Feb. 17, 2017 for U.S. Appl. No. 15/340,000 dated May 17, 2017.

* cited by examiner

PROPPANTS FOR HYDRAULIC FRACTURING TECHNOLOGIES

RELATED APPLICATION

This application claims the benefit of U.S. Provisional Application No. 61/253,350, filed on Oct. 20, 2009. The entire teachings of the above application are incorporated herein by reference.

FIELD OF APPLICATION

This application relates generally to systems and methods for fracturing technologies.

BACKGROUND

In the process of acquiring oil and/or gas from a well, it is often necessary to stimulate the flow of hydrocarbons via hydraulic fracturing. The term fracturing refers to the method of pumping a fluid into a well until the pressure increases to a level which is sufficient to fracture the subterranean geological formations containing the entrapped materials. This results in cracks and breaks that disrupt the underlying layer to allow the hydrocarbon product to be carried to the well bore at a significantly higher rate. Unless the pressure is maintained, the newly formed openings close. In order to open a path and maintain it, a propping agent or proppant is injected along with the hydraulic fluid to create the support needed to preserve the opening. As the fissure is formed, the proppants are delivered in a slurry where, upon release of the hydraulic pressure, the proppants form a pack or a prop that serves to hold open the fractures.

The behavior of the proppants in the fracturing fluids has to meet certain performance requirements. First, in order to place the proppants inside the fracture, proppant particles are suspended in a fluid that is then pumped to its subterranean destination. To prevent the particles from settling, a high viscosity fluid is often required to suspend them. The viscosity of the fluid is typically managed by addition of synthetic or natural based polymers. If the particles were more buoyant, a less viscous suspension fluid could be used, which would still convey the particles to the target area but which would be easier to pump into the formation. Second, it is desirable that the proppants remain where they are placed throughout the lifetime of the well after they have been injected into a fracture line. If changes within the reservoir during well production force the proppants out of position, production equipment can be damaged, and the conductivity of the reservoir formation can be decreased as its pores are plugged by the displaced proppants. Third, the proppants in the system should be resistant to closure stress once they are placed in the fracture. Closure stresses can range from 1700 psi in certain shale gas wells, up to and exceeding 15,000 psi for deep, high temperature wells. Care must be taken that the proppants do not fail under this stress, lest they be crushed into fine particles that can migrate to undesirable locations within the well, thereby affecting production. Desirably, a proppant should resist diagenesis during fracture treatment. The high pressures and temperatures combined with the chemicals used in fracturing (frac) fluids can adversely affect the proppant particles, resulting in their diagenesis, which can eventually produce fine particulate matter that can scale out and decrease the productivity of the well over time.

Current proppant systems endeavor to address these concerns, so that the proppants can be carried by the fracturing fluids, can remain in place once they arrive at their target destination, and can resist the closure stresses in the formation. One approach to preparing suitable proppants includes coating the proppant materials with resins. A resin-coated proppant can be either fully-cured or partially-cured. The fully-cured resin can provide crush resistance to the proppant substrate by helping to distribute stresses among the grain particles. A fully-cured resin can furthermore help reduce fine migration by encapsulating the proppant particle. If initially partially-cured, the resin may become fully cured once it is placed inside the fracture. This approach can yield the same benefits as the use of a resin that is fully-cured initially. Resins, though, can decrease the conductivity and permeability of the fracture, even as the proppants are holding it open. Also, resins can fail, so that their advantages are lost. Finally, resin-based systems tend to be expensive.

Another approach to preparing suitable proppants involves mixing additives with the proppant itself, such as fibers, elastomeric particles, and the like. The additives, though, can affect the rheological properties of the transport slurry, making it more difficult to deliver the proppants to the desired locations within the fracture. In addition, the use of additives can interfere with uniform placement of the proppant mixture into the fracture site. While there are known methods in the art for addressing the limitations of proppant systems, certain problems remain. There is thus a need in the art for improved proppant systems that allow precise placement, preserve fracture conductivity after placement, and protect well production efficiency and equipment life. It is further desirable that such improved systems be cost-effective.

SUMMARY

The invention is directed to composite proppant particles, and systems and method for the use thereof.

In certain aspects, the invention is directed to a composite proppant particle, comprising:

a proppant particulate substrate, an inner polymeric layer deposited on the particulate substrate, and a hydrophilic outer coating layer deposited upon the first layer or on an optional intermediate layer, wherein the inner layer comprises a first polymeric material and the outer layer comprises a second polymeric material.

In another aspect, the invention is directed to an aggregate proppant particle comprising:

a first proppant particulate substrate, and a second proppant particulate substrate affixed thereto, wherein the first proppant particulate substrate comprises a dense material and the second proppant particulate substrate comprises a lower density material.

In one embodiment of the composite proppant particle of the invention, the proppant particulate substrate is an aggregate proppant particle.

The invention also encompasses a proppant system, wherein the system comprises the composite proppant particle and/or aggregate proppant particle of the invention and a fluid delivery vehicle.

In another embodiment, the invention is directed to a treatment fluid comprising a fracturing fluid and a multiplicity of composite proppant particles, wherein the composite proppant particles are suspended in the fracturing fluid and wherein the composite proppant particle comprise:

a proppant particulate substrate, an inner polymeric layer deposited on the particulate substrate, and a hydrophilic, outer coating layer deposited upon the first layer or on an optional intermediate layer, wherein the inner layer comprises a first polymeric material and the outer layer comprises a second polymeric material.

The invention also encompasses a method of fracturing a subterranean geological formation comprising introducing into said formation a treatment fluid wherein the fluid comprises suspended composite proppant particles, wherein each composite proppant particle comprises:

a proppant particulate substrate, an inner polymeric layer deposited on the particulate substrate, and a hydrophilic, outer coating layer deposited upon the first layer or on an optional intermediate layer, wherein the inner layer comprises a first polymeric material and the outer layer comprises a second polymeric material.

DETAILED DESCRIPTION

Disclosed herein are compositions and systems comprising proppant particles and methods for forming and using proppant particles having desirable attributes such as a lower friction coefficient in the wet state, good bonding adhesion with each other after placement in a fracture site, resistance to uncontrolled fines formation, and hydrophilic surface properties to prevent fouling. In embodiments, the disclosed systems for forming proppant particles can be applied to the types of proppant substrates most widely used, e.g., sand and ceramics. In other embodiments, the proppant particles can be formed from a variety of substrates, as would be available to those having ordinary skill in the art. In certain embodiments, the proppant particles can be fabricated so that they resist crush or deformation, so that they resist displacement, and so that they can be suspended in less viscous fluid carriers for transporting into the formation.

In embodiments, the surface of a proppant particulate substrate can be coated with a selected polymer, either as a single layer or as a series of multiple coating layers. The coating (either single layer or multilayer) can show switchable behavior under certain circumstances. As used herein, the term "switchable behavior" or "switching behavior" refers to a change in properties with a change in circumstances, for example, a change from one set of properties during the transport phase and another set of properties inside the fracture. Switching behavior can be seen, for example, when a particle demonstrates hydrophilic properties in the fracturing fluid and adhesive properties when in place within the fractures. Such behavior can be triggered by circumstances like the high closing pressures inside the fracture site so that the outer layer of the coating rearranges itself to exhibit more advantageous properties.

In more detail, the coated particle can switch from hydrophilic to hydrophobic when subjected to the high pressures inside the fractures. During the transport phase, when the hydrophilic covering of the particle is exposed to the water-based fracturing fluid, it will tend to be fully distended. As a result, the coating will provide the particle with lubrication, facilitating its movement through the proppant slurry. When the particle has been conveyed to its destination within the fractures in the formation, the high pressures there will overcome the steric repulsions of the external hydrophilic polymer chains, forcing the outer layer to rearrange itself so that the inner layer is exposed. In embodiments, the switchable inner layer can be hydrophobic or adhesive, or both. As the inner layer becomes exposed, its properties manifest themselves. If the inner layer has adhesive properties, for example, it can fix the particles to each other to prevent their flowback. This inner layer can also be configured to capture fines in case the proppant particle fails. Moreover, the residual intact hydrophilic groups present in the outer coating can allow easy flow of oil through the proppant pack.

In embodiments, a coated proppant particle can be produced that bears the following layers of coating. First, a pressure-activated fixative polymer can be used to coat the proppant substrate. This coating layer can be elastomeric, thereby providing strength to the proppant pack by helping to agglomerate the proppant particles and distribute stress. In addition, this coating layer can encapsulate the substrate particles and retain any fines produced in the event of substrate failure. Second, a block copolymer can be adsorbed or otherwise disposed onto the first layer of coating. The copolymer can have a section with high affinity for the first polymeric layer, allowing strong interaction (hydrophobic interaction), and can have another section that is hydrophilic, allowing for easy transport of the proppant in the transport fluid.

In certain embodiments, a stronger interaction between the first and second coating layers may be useful. To accomplish this, a swelling-deswelling technique can be implemented. For example, the block copolymer can be adsorbed onto the surface of the elastomeric-coated particle. Then, the first coating layer can be swelled with small amount of an organic solvent that allow the hydrophobic block of the copolymer to penetrate deeper into the first coating layer and to become entangled in the elastomeric coating. By removing the organic solvent, the layered polymeric composite will deswell, resulting in a stronger interaction of copolymer with the elastomeric particle. A method for swelling-deswelling technique is set forth in "Swelling-Based Method for Preparing Stable, Functionalized Polymer Colloids," A. Kim et al., J. Am. Chem. Soc (2005) 127: 1592-1593, the entire contents of which are incorporated by reference herein.

While the systems described herein refer to a two-layer coating system, it is understood that there may be multiple coating layers forming the composite proppant particles disclosed herein, with the each of the multiple coating layers possessing some or all of the attributes of the two coating layers described in the exemplary embodiments.

1. Particulate Substrate Materials

Composite proppant particles in accordance with these systems and methods can be formed using a wide variety of proppant substrate particles. Proppant particulate substrates for use in the present invention include graded sand, resin coated sand, bauxite, ceramic materials, glass materials, walnut hulls, polymeric materials, resinous materials, rubber materials, and the like. In embodiments, the substrates can include naturally occurring materials, for example nutshells that have been chipped, ground, pulverized or crushed to a suitable size (e.g., walnut, pecan, coconut, almond, ivory nut, brazil nut, and the like), or for example seed shells or fruit pits that have been chipped, ground, pulverized or crushed to a suitable size (e.g., plum, olive, peach, cherry, apricot, etc.), or for example chipped, ground, pulverized or crushed materials from other plants, such as corn cobs. In embodiments, the substrates can be derived from wood or processed wood, including but not limited to woods such as oak, hickory, walnut, mahogany, poplar, and the like. In embodiments, aggregates can be formed, using an inorganic material joined or bonded to an organic material. Desirably, the proppant particulate substrates will be comprised of particles (whether individual substances or aggregates of two or more substances) having a size in the order of mesh size 4 to 100 (US Standard Sieve numbers). As used herein, the term "particulate" includes all known shapes of materials without limitation, such as spherical materials, elongate materials, polygonal materials, fibrous materials, irregular materials, and any mixture thereof.

In embodiments, the particulate substrate can be formed as a composite from a binder and a filler material. Suitable filler materials can include inorganic materials such as solid glass, glass microspheres, fly ash, silica, alumina, fumed carbon, carbon black, graphite, mica, boron, zirconia, talc, kaolin, titanium dioxide, calcium silicate, and the like. In certain embodiments, the proppant particulate substrate can be reinforced to increase its resistance to the high pressure of the formation which could otherwise crush or deform them. Reinforcing materials can be selected from those materials that are able to add structural strength to the proppant particulate substrate, for example high strength particles such as ceramic, metal, glass, sand, and the like, or any other materials capable of being combined with a particulate substrate to provide it with additional strength.

In certain embodiments, the proppant particulate substrate can be fabricated as an aggregate of two or more different materials providing different properties. For example, a core particulate substrate of a dense material, preferably having high compression strength, can be combined with a material having a lower density than the high-compression-strength material. In one embodiment, the material having high compression strength is a dense material. A "dense material", as this term is used herein, is a material having a density greater than about 1.5 g/cm$^3$, preferably in the range of 1.5 to 3 g/cm$^3$. A "lower density material" is a material having a density less than the density of the dense material. In an embodiment, the lower density material has a density which is from about 0.1 to about 2.5 g/cm$^3$ less than that of the dense material. In an embodiment, the lower density material has a density less than about 1.5 g/cm$^3$. The combination of these two materials as an aggregate can provide a core particle having an appropriate amount of strength, while having a lower density than the dense material. Preferably, the lower density material is buoyant in the medium in which the proppant is to be suspended. In one embodiment, the medium is a fracturing fluid. The fracturing fluid can be water or an aqueous solution having a density from about 1 g/cm$^3$ to about 1.4 g/cm$^3$. As a lower density particle, it can be suspended adequately in a less viscous fracturing fluid, allowing the fracturing fluid to be pumped more easily, and allowing more dispersion of the proppants within the formation as they are propelled by the less viscous fluid into more distal regions. High density materials used as proppant particulate substrates, such as sand, ceramics, bauxite, and the like, can be combined with lower density materials such as hollow glass particles, other hollow core particles, certain polymeric materials, and naturally-occurring materials (nut shells, seed shells, fruit pits, woods, or other naturally occurring materials that have been chipped, ground, pulverized or crushed), yielding a less dense aggregate that still possesses adequate compression strength.

As used herein, the term "buoyant" refers to particles or materials having either neutral or positive buoyancy with respect to the suspending medium, such that the particles have a lower density than the suspending medium and they do not settle in the direction of gravity.

Aggregates suitable for use as proppant particulate substrates can be formed using techniques to attach the two components to each other. As one preparation method, a proppant particulate substrate can be mixed with a lower density material having a particle size similar to the size of the proppant particulate substrates. The two types of particles can then be mixed together and bound by an adhesive, such as a wax, a phenol-formaldehyde novolac resin, etc., so that a population of doublet aggregate particles are formed, one subpopulation having a proppant particulate substrate attached to another similar particle, one subpopulation having a proppant particulate substrate attached to lower density particle, and one subpopulation having a low density particle attached to another lower density particle. The three subpopulations could be separated by their difference in density: the first subpopulation would sink in water, the second subpopulation would remain suspended in the liquid, and the third subpopulation would float.

In other embodiments, a proppant particulate substrate can be engineered so that it is less dense by covering the surface of the particulate substrate with a lower density coating comprising, for example, a foamy material. The thickness of the foamy material can be designed to yield a composite that is effectively neutrally buoyant. To produce such a coated proppant particulate, a particle having a desirable compression strength can be coated with one reactant for a foaming reaction, followed by exposure to the other reactant. With the triggering of foam formation, a foam-coated proppant particulate will be produced.

As an example, a water-blown polyurethane foam can be used to provide a coating around the particles that would lower the overall particle density. To make such a coated particle, the particle can be initially coated with Reactant A, for example a mixture of one or more polyols with a suitable catalyst (e.g., an amine). This particle can then be exposed to Reactant B containing a diisocyanate. The final foam will form on the particle, for example when it is treated with steam while being shaken; the agitation will prevent the particles from agglomerating as the foam forms on their surfaces.

The foamy material can be applied to an uncoated proppant particle or a proppant particle having a single coating layer, such as an inner coating layer and optional intermediate layers as described herein. In an embodiment, the foamy material is applied to a composite proppant particle of the invention. In another embodiment, the proppant particle is a composite particle of the invention and the foamy layer is hydrophilic and is the outer layer of the composite particle.

2. Inner Polymeric Layer

In designing the polymers for the inner polymeric layer, a variety of pressure-sensitive adhesive polymers can be used, having different functionalities and molecular weights. As used herein, the inner polymer layer is the first coating layer that is applied to the proppant particulate substrate. Polymeric design for this inner polymeric layer can be directed by such variables as chemical resistance, ultimate adhesion, service temperature, and the like, so that a coating material can be selected that is targeted to the projected proppant usage temperature. The coating can be optimized to produce strong adhesion among proppant particles at different temperatures. For example, in formulating the inner polymeric layer, it will be recognized that the temperature in the formation is relatively high (from 30° to 100° C.), so that an adhesive would need to be designed to withstand such high temperatures while still retaining its stickiness. A formulation may be required comprising polymers with relatively high glass transition temperatures, for example, in order to withstand these high temperatures.

In embodiments, coating thickness can be varied, which can have specific effects on the strength of adhesion of the proppant particles as well. Appropriate coating methods can include solution coating or in-situ coating where the polymer is synthesized in the presence of the proppant substrate particle.

In embodiments, the inner polymeric layer can be made from a phenolic resin, an epoxy resin, a furan resin, a phenolic formaldehyde resin, a melamine formaldehyde resin, a urethane resin, a phenolic, furan resin mixture, a urea-aldehyde resin, a urethane resin, a furan/furfuryl alcohol resin, a phenolic/latex resin, a polyester resin, an acrylate resin, or a combination of two or more thereof. In another embodiment of the invention, the inner polymeric layer with adhesive material can be a thermoplastic resin. Examples of suitable thermoplastic resins include: styrene block copolymers such as: SBS (styrene-butadine-styrene), SIS (styrene-isoprene-styrene), SEBS (styrene-ethylene/butylene-styrene), SEP (styrene-ethylene/propylene); ABS copolymers (i.e., acrylonitrile-butadiene-styrene); EVA (ethylene vinyl acetate) copolymers; acrylic polymers; vinyl ethers; and silicone rubbers. A commercial thermoplastic, for example the ENABLE family of products available from ExxonMobil Chemical Co, can be used; these materials are a family of n-butyl acrylate copolymers (e.g., ENABLE EN 33900 and 60 ENABLE 33330).

In embodiments, these materials can be mixed with other resins (tackifiers) that will increase their stickiness. Examples of tackifiers are: rosins and their derivatives, terpenes and their derivatives, shellac resin, small molecular weight aliphatic, cycloaliphatic and aromatic resins (less than 10 carbons), terpene-phenol resin, saturated hydrocarbon resin. As an example of composition, the tackifier agent can comprises 30-70% by weight of the combined weight of tackifier agent and thermoplastic resin.

In embodiments, the inner polymeric layer can be applied to the particulate substrate by methods familiar to artisans of ordinary skill. For example, the application of the inner layer can be performed by solution coating or by 100% solid coating (no solvent needed). In embodiments, the inner layer can be applied in an amount of 0.25 to 10 weight percent of the proppant substrate, for example, in an amount of 0.5 to 5 percent.

3. Outer Coating Layer

It is desirable to impart hydrophilic features to the coated particle. In the aqueous environment of the hydraulic fracturing fluid, a hydrophilic coating can create a thin, water-like layer on the surface of the particle, making it slippery and reducing the friction between particles. This can facilitate the transport of the particles in the fluid.

A second coating layer can be applied as an outside layer to provide the desirable hydrophilic features to the overall particle. In other embodiments, one or more intermediate layers can be applied to the particle, then the outermost hydrophilic layer can be provided. In the description that follows, the second coating layer forms the outer coating of the particle. It is understood, though, that the outer hydrophilic coating may be applied to any number of inner, intermediate layers, while still maintaining the advantageous properties of the particles in accordance with the present disclosure.

In embodiments, the outer layer can be partially or wholly formed from a polymer. For example, a suitable block copolymer can be designed having hydrophobic and hydrophilic sections or regions. Variables involved in copolymer design include the molecular weight of polymer, ratio of hydrophobic to hydrophilic section, and the functionalities of the copolymer. The outer layer, for example a second coating layer, can be adsorbed onto the first layer or onto an intermediate layer using conventional methods of polymer adsorption, as would be known in the art, and/or swelling-deswelling using organic solvents.

In embodiments where a polymer layer is used as the outer coating layer, the polymer coating can be made from hydrophilic polymers like ethylene oxide/propylene oxide (EO/PO) copolymers, polyvinyl acetate, polyethylene-co-vinyl acetate, polyvinyl alcohol, polysaccharides, and the like. In embodiments, the outer layer can be fabricated from block copolymers having hydrophilic and hydrophobic segments. Such materials can be diblock, triblock or multiblock copolymers. For example, an ethylene oxide/propylene oxide block copolymer can be used, for example the Pluronic family of copolymers (BASF). As another example, Guerbet alcohol ethoxylates, lauryl alcohol-tridecyl alcohol-stearyl alcohol-nonylphenol- or octylphenol-ethoxylates, for example the Lutensol family of products (BASF). In embodiments, the selected materials will have a high hydrophilic-lipophilic balance, so that the product is substantially more hydrophilic than hydrophobic. Examples of such materials include certain stearyl alcohol and nonylphenol-ethoxylates.

In embodiments, the outer layer can be applied to the first layer or to an intermediate layer using a swelling-based method. According to such a method, the first layer or an intermediate layer can be exposed to a solvent that can swell this layer without dissolving it. The polymer for the second layer, having both hydrophilic and hydrophobic segments, can be dissolved in the same solvent. When the solution bearing the second layer polymer is put into contact with the particles bearing the swollen first layer, the hydrophobic segments of the polymer will tend to interact with the hydrophobic first layer, resulting in entanglement of the two hydrophobic entities. When the solvent is removed, the first layer will deswell, locking the hydrophobic attachments of the second-layer polymer in place. The hydrophilic segments of the second-layer polymer will be directed outwardly, away from the inner layer.

In other embodiments, the outer layer can be formed by chemical reaction or modification of the inner polymer layer or an intermediate layer. For example, the outer surface of the inner polymer layer or an intermediate layer can be oxidized, etched, epoxidized, ethoxylated, hydrolyzed, or otherwise coated to protect the inner polymer layer from the fluid environment in the fracture.

EXAMPLES

Example 1

Preparation of Inner Polymeric Layer Material

A material suitable for the inner polymeric layer of a coated proppant particle can include a pressure sensitive adhesive. Such an adhesive can be prepared as follows:

15 gm of a 10 wt % tetrahydrofuran solution of Polystyrene-block-polyisoprene-block-polystyrene (22 wt % styrene and a viscosity of 750-1250 cps at a 25% solution in toluene at 25° C.) (Aldrich) was mixed with 15 g of a 10 wt % tetrahydrofuran solution of Colophony rosin gum (acid value of 150-170) (Aldrich).

Example 2

Coating Sand Particles with Inner Polymeric Layer Material

Quartz sand particles (50-70 mesh particle size) (Aldrich) were coated with 0.5 wt % of the material prepared in Example 1 by solution coating using the following procedure:

30 gm of the solution from Example 1 was added to approximately 270 gm of tetrahydrofuran in a 1 liter round bottom flask, and mixed thoroughly. Once the solution was homogeneous, 300 g of the quartz sand was added. The solvent was then evaporated under vacuum in a rotary evaporator to yield sand particles with adhesive properties. The coated sand particles were further characterized in Examples 4 and 5 below.

Example 3

Applying an Outer Polymeric Layer to the Coated Sand Particles

To 100 ml of ethyl alcohol (Aldrich) was added 0.5 g of PLURONIC® F127 Prill (BASF 100 Campus Drive, Florham Park, N.J. 07932). The mixture was stirred under mild heat until the entire solid dissolved. To the resulting solution was added 100 g of the product from Example 2. The mixture was stirred for 30 minutes and the solvent evaporated under vacuum in a rotary evaporator to yield sand particles with adhesive and hydrophilic properties. The coated sand particles were further characterized in Examples 4 and 5 below.

Example 4

Characterization of Frictional Forces between Coated Sand Particles

Coated sand particles prepared in accordance with Examples 2 and 3 were analyzed by the high solids rheology test. Control samples (Aldrich) without any treatment (as-received sand) were tested along with the samples prepared in accordance with Example 2 and Example 3. All samples were analyzed in the dry and water wet state (a minimum amount of water was added to the dry sample to wet all the particles). A Brookfield model DV-III Viscometer with a #4 spindle was employed. The test was performed by rotating the spindle at 20 rpm for 1 minute: then the applied torque was turned off and the maximum torque at this point was recorded. The results of these tests are set forth in Table 1.

TABLE 1

| Sample | % Torque - Maximum |
|---|---|
| As-received sand - Dry | 28.1 |
| As-received sand - Wet | 42.8 |
| Example 2 - Dry | >110(*) |
| Example 2 - Wet | >110(*) |
| Example 3 - Dry | >110(*) |
| Example 3 - Wet | 50 |

(*)110% Torque is the maximum reading for the instrument

The maximum torque, as measured by these tests, gives an indication of the frictional forces between particles. The higher values of Maximum % Torque for particles in Example 2 and 3 compared to the as-received sand, indicate that the coating applied to the sand act as an adhesive, consolidating the particles together and increasing the maximum torque needed to rotate the spindle. The comparison of the Maximum % Torque of the wet samples in Example 2 with the samples prepared in Example 3 shows a smaller value for Example 3 sample, indicating that the second layer (which is hydrophilic) has affected the surface of the particles so as to provide better lubrication when water-wet.

Example 5

Characterization of Cohesiveness of Coated Sand Particles

A 5 gm sample of the particles prepared in each of Examples 2 and 3, and 5 gms of the control samples (Aldrich) as received was placed on a stainless steel circular plate (2.24 inches diameter). Another plate of same shape and size was placed on top of the sample. Then the 2 plates containing the sample were placed in a Carver Laboratory Press (Model C) and the desired pressure applied (1269, 2539 or 3808 psi) for 1 minute. Next, the top plate was carefully removed and the amount of sample adhered to it weighted. The bottom part of the mold was then elevated at an angle of approximately 45° and tapped several times. The amount of sample adhering to the plate was then removed and weighed. The results are set forth in Table 2.

TABLE 2

| | Example 2 | | Example 3 | | As-received sand | |
|---|---|---|---|---|---|---|
| Pressure/psi | Weight/g Top plate | Weight/g Bottom plate | Weight/g Top plate | Weight/g Bottom plate | Weight/g Top plate | Weight/g Bottom plate |
| 1269 | 0 | 0.561 | 0 | 0.522 | 0 | 0 |
| 2539 | 0 | 2.335 | 0 | 0.581 | 0 | 0 |
| 3808 | 0.411 | 3.711 | 0 | 1.009 | 0 | 0 |

The results in Table 2 indicate that the as-received sand does not stick to the plates at all. For samples from Example 2 and 3 there is a fraction of the sample that remained on the plates, demonstrating the cohesiveness of the particles. At the higher applied pressure, a larger amount of the samples remained on the plates. More of the samples from Example 2 remained attached to the plates at both pressure levels, indicating higher cohesiveness than for Example 3.

Example 6

Preparation of Polyurethane-Foam-Encapsulated Sand Particles

Polyurethane-foam-encapsulated sand particles can be prepared as follows:

A prepolymer of poly(propylene oxide) glycol and 2,4-toluenediisocyanate can be prepared by placing 200 g of dried polypropylene glycol (molecular weight 2,000, hydroxyl number 56.1) in a reactor equipped with a stirrer, condenser with drying tube, thermometer and gas inlet with nitrogen flush. Next, 0.8 g of water can be added. After stirring the mixture for a few minutes, 29.4 g of toluene diisocyanate can be added. The mixing can be continued and the temperature increased to 110° C. for 1 hour. The resulting material is a prepolymer ready to be coated and foamed onto the sand particles.

25 gm of 50-70 mesh sand can then be placed in a plastic container. To this can be added 1 g of the prepolymer prepared in the previous step and 1 drop of triethylamine. The mixture can be mixed in a speed mixer at 3,000 rpm for 1 minute to yield homogeneously coated sand particles. Next the coated particles were placed in an oven at 100° C. for 30 minutes while steam is flown though it in order to finalize the foaming process. The foam as described in this Example would be designed to have a density of approximately 40 kg/m$^3$. The coating encapsulating the sand particles would comprise about 50% by volume of the total volume of the coated particle. The thickness of the coating has been designed to give a neutral buoyant particle according to Stokes' law.

Example 7

Preparation of Sand Particle Attached to Buoyant Particles

This experiment shows a method of attaching low density particles to sand to yield composite particles with improved buoyant properties. In a plastic container was placed 2.68 gm of sand (50-70 mesh size from Aldrich), 0.63 g of 3M™ Glass Bubbles K20 (hollow glass microspheres with density 0.2 g/cm$^3$), and 0.3 g of a paraffin wax (53-57° C.) from Aldrich. The mixture was mixed in a speed mixer at 3,000 rpm for 5 minutes. The resulting product was a homogeneous free flowing solid. The sample was characterized by comparing the settling rate of the glass-bubbles-treated sand with the as-received sand in water (control). To characterize the samples, 2 burettes were filled with water; and approximately 0.5 g of the treated and as-received sand was added to each burette. The settling rate for each sample was monitored by following the time needed for the particles to reach the bottom of the burette. The results indicated that for the treated sand the settling rate was approximately half of the as-received sand, showing the improved buoyant properties of the treated sand.

EQUIVALENTS

While specific embodiments of the subject invention have been disclosed herein, the above specification is illustrative and not restrictive. While this invention has been particularly shown and described with references to preferred embodiments thereof, it will be understood by those skilled in the art that various changes in form and details may be made therein without departing from the scope of the invention encompassed by the appended claims. Many variations of the invention will become apparent to those of skilled art upon review of this specification. Unless otherwise indicated, all numbers expressing reaction conditions, quantities of ingredients, and so forth, as used in this specification and the claims are to be understood as being modified in all instances by the term "about." Accordingly, unless indicated to the contrary, the numerical parameters set forth herein are approximations that can vary depending upon the desired properties sought to be obtained by the present invention.

What is claimed:

1. A treatment fluid comprising an aqueous fracturing fluid and composite proppant particles, wherein the composite proppant particles are suspended in the fracturing fluid and wherein the suspended composite proppant particles comprise: a proppant particulate substrate, an inner polymeric coating deposited on the particulate substrate wherein the inner polymeric coating comprises a pressure sensitive adhesive polymer, and an outer polymeric coating deposited upon the inner polymeric coating or on an optional intermediate coating wherein the outer polymeric coating comprises a hydrophilic polymer selected from the group consisting of EO/PO copolymers, polyvinyl acetate, polyethylene-co-vinyl acetate, polyvinyl alcohol, polysaccharides and combinations thereof, wherein this outer polymer coating is selected so that
   (a) when this outer polymer coating is exposed to a water-based fracturing fluid, it distends and imparts hydrophilic properties to the coated particles, and
   (b) when the composite proppant reaches its destination within the fracture, this outer polymer coating rearranges itself to expose the inner polymeric layer, thereby enabling multiple composite proppant particles to fix themselves to one another.

2. The treatment fluid of claim 1, wherein the proppant particulate substrate comprises sand.

3. The treatment fluid of claim 1, wherein the proppant particulate substrate comprises ceramic.

4. The treatment fluid of claim 1, wherein the proppant particulate substrate has a specific gravity from about 1.0 to about 2.7 g/cc.

5. The treatment fluid of claim 1, wherein the inner polymeric coating comprises a polymer selected from the group consisting of styrene block copolymers including SBS (styrene-butadiene-styrene), SIS (styrene-soprene-styrene), SEBS (styrene-ethylene/butylene-styrene) and SEP (styrene-ethylene/propylene); ABS copolymers including acrylonitrile-butadiene-styrene); EVA (ethylene vinyl acetate) copolymers; acrylic polymers; vinyl ethers; and silicone rubbers.

6. The treatment fluid of claim 1, wherein the outer polymeric coating is selected so that when this outer polymer coating is exposed to a water-based fracturing fluid, it distends to exhibit hydrophilic properties capable of facilitating movement of the composite proppant when wet through the subterranean geological formation.

7. A treatment fluid comprising an aqueous fracturing fluid and composite proppant particles, wherein the composite proppant particles are suspended in the fracturing fluid and wherein the suspended composite proppant particles comprise: a proppant particulate substrate, an inner polymeric coating deposited on the particulate substrate wherein the inner polymeric coating comprises an adhesive polymer, and an outer polymeric coating deposited upon the inner polymeric coating or on an optional intermediate coating, wherein the outer polymeric coating comprises a hydrophilic polymer selected from the group consisting of EO/PO copolymers, polyvinyl acetate, polyethylene-co-vinyl acetate, polyvinyl alcohol, polysaccharides and combinations thereof, wherein this outer polymer coating is selected so that (a) when this outer polymer coating is exposed to a water-based fracturing fluid, it distends and imparts hydrophilic properties to the coated particles, and (b) when the composite proppant reaches its destination within the fracture, this outer polymer coating rearranges itself to expose the inner polymeric layer, thereby enabling multiple composite proppant particles to fix themselves to one another.

* * * * *